(12) United States Patent
Naraki

(10) Patent No.: US 8,929,187 B2
(45) Date of Patent: Jan. 6, 2015

(54) ONBOARD OPTICAL DISC DEVICE

(71) Applicant: Panasonic Corporation, Osaka (JP)

(72) Inventor: Atsutoshi Naraki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/358,530

(22) PCT Filed: Nov. 15, 2012

(86) PCT No.: PCT/JP2012/007343
§ 371 (c)(1),
(2) Date: May 15, 2014

(87) PCT Pub. No.: WO2013/073188
PCT Pub. Date: May 23, 2013

(65) Prior Publication Data
US 2014/0328152 A1 Nov. 6, 2014

(30) Foreign Application Priority Data

Nov. 15, 2011 (JP) .................................. 2011-249270

(51) Int. Cl.
*G11B 11/00* (2006.01)

(52) U.S. Cl.
USPC ..................................... 369/53.12; 369/53.37

(58) Field of Classification Search
None
See application file for complete search history.

(56) References Cited

U.S. PATENT DOCUMENTS 5,469,419 A * 11/1995 Iida et al. .................... 369/53.12
5,566,077 A * 10/1996 Kulakowski et al. ......... 700/299
6,564,332 B1 * 5/2003 Nguyen et al. ................ 713/340
6,760,183 B2 * 7/2004 Kusumoto ................. 360/77.04
8,068,940 B2 * 11/2011 Adachi et al. ................. 700/299

FOREIGN PATENT DOCUMENTS

| JP | 2-101674 | 4/1990 |
|---|---|---|
| JP | 3-290865 | 12/1991 |
| JP | 2002-251816 | 9/2002 |
| JP | 2003-257022 | 9/2003 |
| JP | 2005-327347 | 11/2005 |
| JP | 2007-102956 | 4/2007 |
| JP | 2009-146552 | 7/2009 |
| JP | 2009-211786 | 9/2009 |
| JP | 2011-211103 | 10/2011 |

OTHER PUBLICATIONS

International Search Report issued Jan. 15, 2013 in International Application No. PCT/JP2012/007343.

* cited by examiner

*Primary Examiner* — Paul Huber
(74) *Attorney, Agent, or Firm* — Wenderoth, Lind & Ponack, L.L.P.

(57) ABSTRACT

When the temperature of a main CPU detected by a temperature sensor exceeds a set temperature, a sub CPU drives a drive unit of an optical disc under the condition where the operation of the main CPU is suspended to stop the rise in temperature caused by the main CPU. In this case, cooling of the main CPU advances by the wind based on the driving of the optical disc, and as a result, the suspension time of data reading from the optical disc or data writing to the optical disc until the main CPU restarts can be shortened.

4 Claims, 5 Drawing Sheets

ONBOARD OPTICAL DISC DEVICE

This application is a 371 of PCT/JP2012/007343, filed Nov. 15, 2012.

TECHNICAL FIELD

The present invention relates to an onboard optical disc device.

BACKGROUND ART

A conventional onboard optical disc device includes a drive unit of an optical disc, a loading unit that conveys the optical disc to the drive unit or ejects the optical disc from the drive unit, an optical pickup unit that performs data reading from the optical disc driven by the drive unit or data writing to the optical disc, and a unit connected to the optical pickup unit, the loading unit and the drive unit. Moreover, a temperature sensor is connected to a control unit.

In the above-described conventional onboard optical disc device, when the temperature sensor detects that the in-vehicle temperature is high, both data reading from the optical disc and data writing to the optical disc are suspended. Thereafter, when the in-vehicle temperature is decreased by opening a window or by the air conditioner, the suspension of data reading from the optical disc or data writing to the optical disc is lifted.

However, the conventional onboard optical disc device where optical disc reading or writing cannot be performed until the in-vehicle temperature is decreased is extremely non-user-friendly. For this reason, it is required to shorten the operation suspension time when the interior of the vehicle is in high temperature state.

Although not an onboard optical disc device, in an optical disc device described in Patent Document 1, a microcomputer controls a motor drive unit to drive the optical disc, thereby generating wind, and by this wind, the optical pickup unit, for example, is cooled.

PRIOR ART DOCUMENT

Patent Document

Patent Document 1: JP-A-2007-102956

SUMMARY OF THE INVENTION

Problem that the Invention is to Solve

In the above-explained optical disc device described in Patent Document 1, wind is generated by driving the optical disc, and the optical pickup unit is cooled by this wind. However, even if the optical disc device is mounted on a vehicle, the vehicle interior is frequency in extremely high temperature state, and since the microcomputer has its function already suspended in high temperature state, it is impossible to start the drive unit.

An object of the present invention is to provide an onboard optical disc device capable of shortening the suspension time of data reading from an optical disc or data writing to the optical disc when the in-vehicle temperature is high.

Means for Solving the Problems

The present invention provides an onboard optical disc device including: a drive unit for an optical disc; a loading unit that conveys the optical disc to the drive unit or ejects the optical disc from the drive unit; an optical pickup unit that performs data reading from the optical disc driven by the drive unit or data writing to the optical disc; and a control unit connected to the optical pickup unit, the loading unit and the drive unit, the control unit has: a main CPU connected to the drive unit and the optical pickup unit; a sub CPU connected to the loading unit and the drive unit; and a temperature sensor that detects a temperature of the main CPU, and when the temperature of the main CPU detected by the temperature sensor exceeds a set temperature, the sub CPU drives the drive unit.

Advantage of the Invention

The onboard optical disc device according to the present invention includes the drive unit of an optical disc, the loading unit that conveys the optical disc to the drive unit or ejects the optical disc from the drive unit, the optical pickup unit that performs data reading from the optical disc driven by the drive unit or date writing to the optical disc, and the control unit connected to the optical pickup unit, the loading unit and the drive unit; the control unit has the main CPU connected to the drive unit and the optical pickup unit, the sub CPU connected to the loading unit and the drive unit, and the temperature sensor that detects the temperature of the main CPU; and when the temperature of the main CPU detected by the temperature sensor exceeds the set temperature, the sub CPU drives the drive unit. Consequently, the suspension time of data reading from the optical disc and data writing to the optical disc when the in-vehicle temperature is high can be shortened.

Moreover, when the temperature of the main CPU detected by the temperature sensor exceeds the set temperature, the sub CPU drives the drive unit under the condition where the operation of the main CPU is suspended to stop the rise in temperature caused by the main CPU. In this case, cooling of the main CPU advances by the wind based on the driving of the optical disc, and as a result, the suspension time of data reading from the optical disc or data writing to the optical disc until the main CPU restarts can be shortened.

MODE FOR CARRYING OUT THE INVENTION

Hereinafter, an embodiment of the present invention will be described by using the attached drawings.

Figure 1:
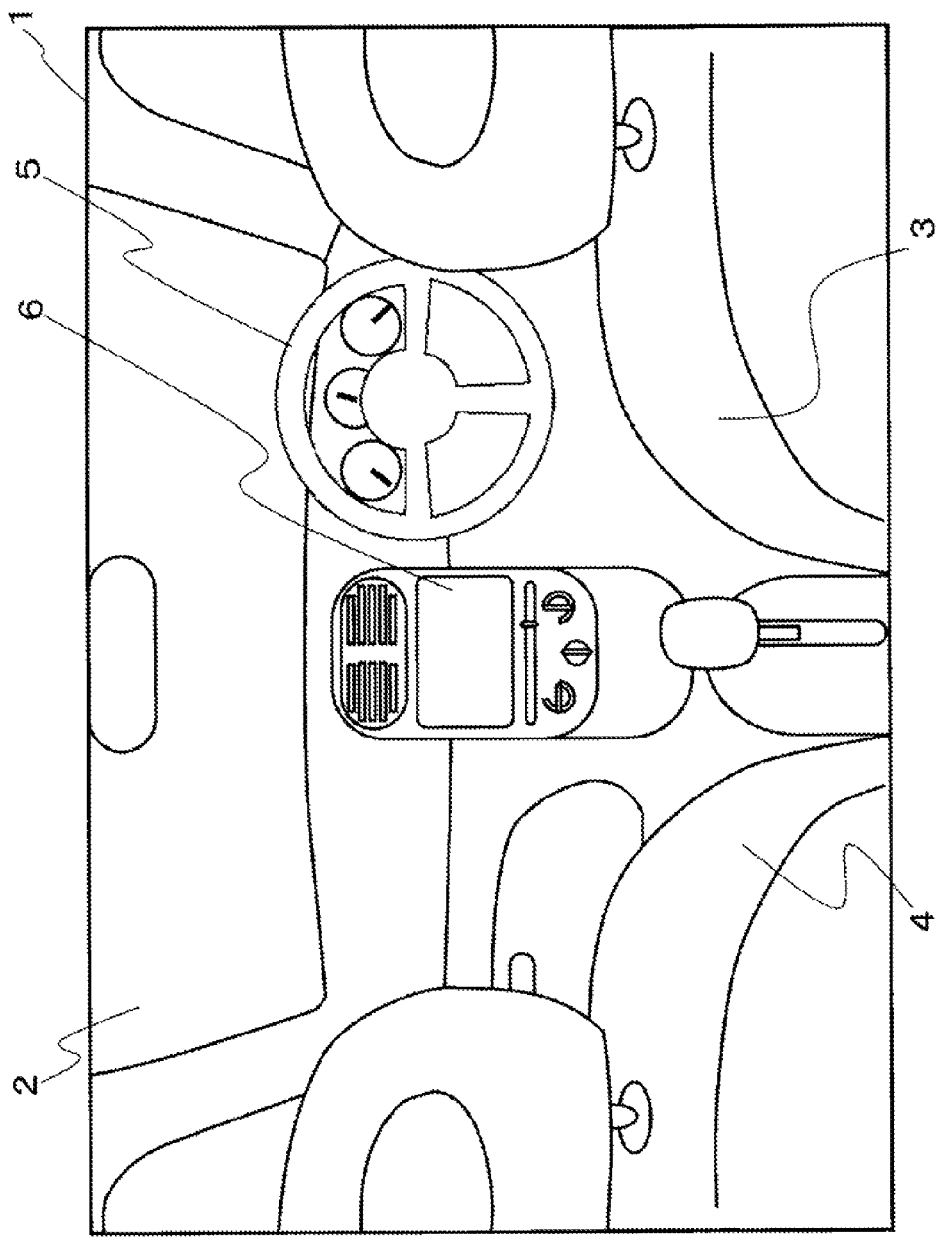
FIG. 1 A view showing a front part of the interior of an automobile mounted with an onboard optical disc device of an embodiment.

FIG. 1 is a view showing a front part of the interior of an automobile mounted with an onboard optical disc device of the embodiment. As shown in FIG. 1, a driver seat 3 and a passenger seat 4 are provided in the front part of the interior 2 of the automobile 1. Moreover, a steering wheel 5 is provided in front of the driver seat 3, and the onboard optical disc device 6 is disposed on the left side of the steering wheel 5.

Figure 2:
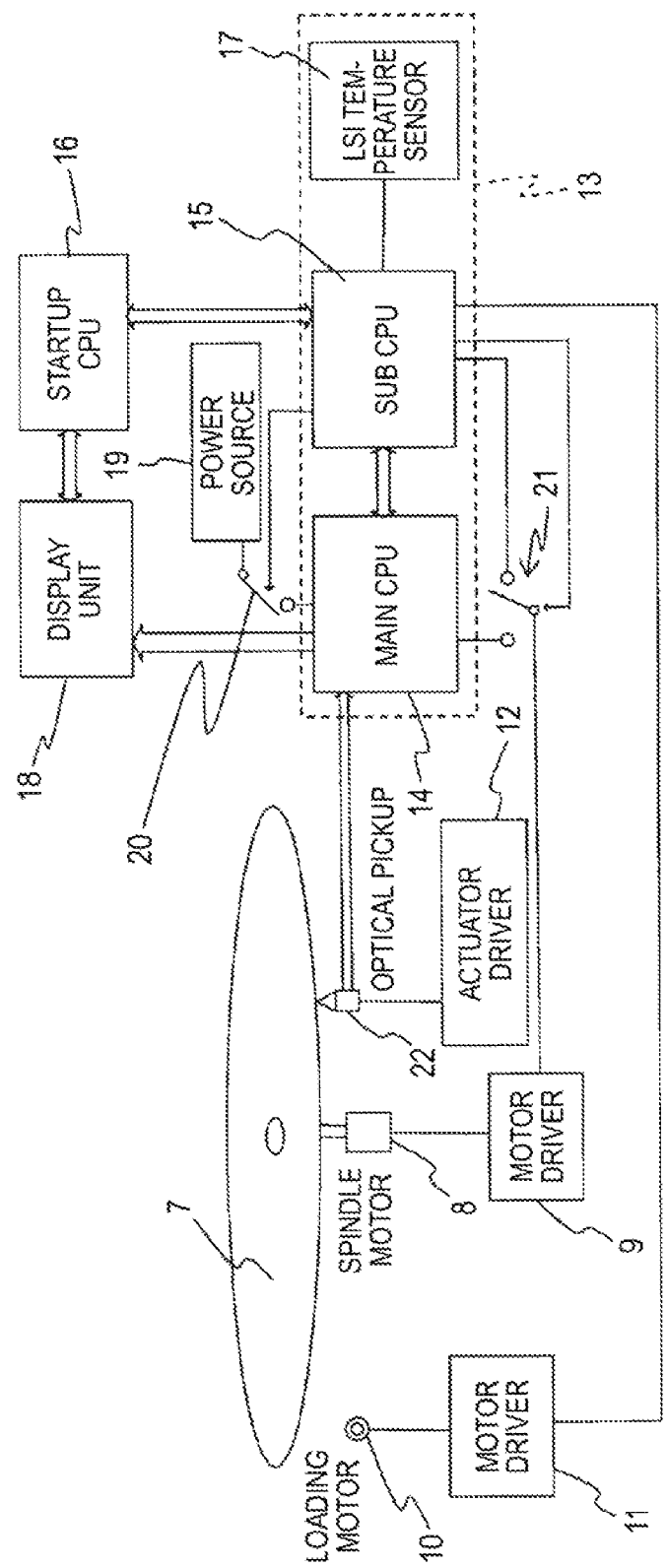
FIG. 2 A block diagram showing the internal structure of the onboard optical disc device of the embodiment.

FIG. 2 is a block diagram showing the internal structure of the onboard optical disc device 6. As shown in FIG. 2, the onboard optical disc device 6 includes a drive unit 8, a motor driver 9, a loading unit 10, a motor driver 11, an optical pickup unit 22, an actuator driver 12, a control unit 13, a startup CPU 16, a display unit 18, a power source 19, a switch 20, and a switch 21.

The drive unit 8 includes a spindle motor that drives an optical disc 7. The motor driver 9 drives the spindle motor of the drive unit 8. The loading unit 10 includes a loading motor that conveys the optical disc 7 to the drive unit 8 or ejects the optical disc 7 from the drive unit 8. The motor driver 11 drives the loading motor of the loading unit 10. The optical pickup unit 22 includes an optical pickup that performs data reading from the optical disc 7 driven by the drive unit 8 or data writing to the optical disc 7. The actuator driver 12 drives the optical pickup of the optical pickup unit 22.

To the optical pickup unit 22, the loading unit 10 and the drive unit 8, the control unit 13 is connected.

The control unit 13 has a main CPU 14 connected to the drive unit 8 and the optical pickup unit 22, a sub CPU 15 connected to the loading unit 10 and the drive unit 8, and an LSI temperature sensor 17 that detects the temperatures of the main CPU 14, the sub CPU 15 and the startup CPU 16.

In the onboard optical disc device 6 of the present embodiment, when the temperature of the main CPU 14 detected by the LSI temperature sensor 17 exceeds a set value, the drive unit 8 is driven by the sub CPU 15.

To the main CPU 14 and the startup CPU 16, the display unit 18 is connected. The sub CPU 15 opens and closes the switch 20 provided between the main CPU 14 and the power source 19. Further, the sub CPU 15 drives the switch 21 that selectively switches between the main CPU 14 and the sub CPU 15 with respect to the motor driver 9.

Hereinafter, an operation of playing back the optical disc 7 by the onboard optical disc device 6 of the present embodiment will be described.

Figure 3:
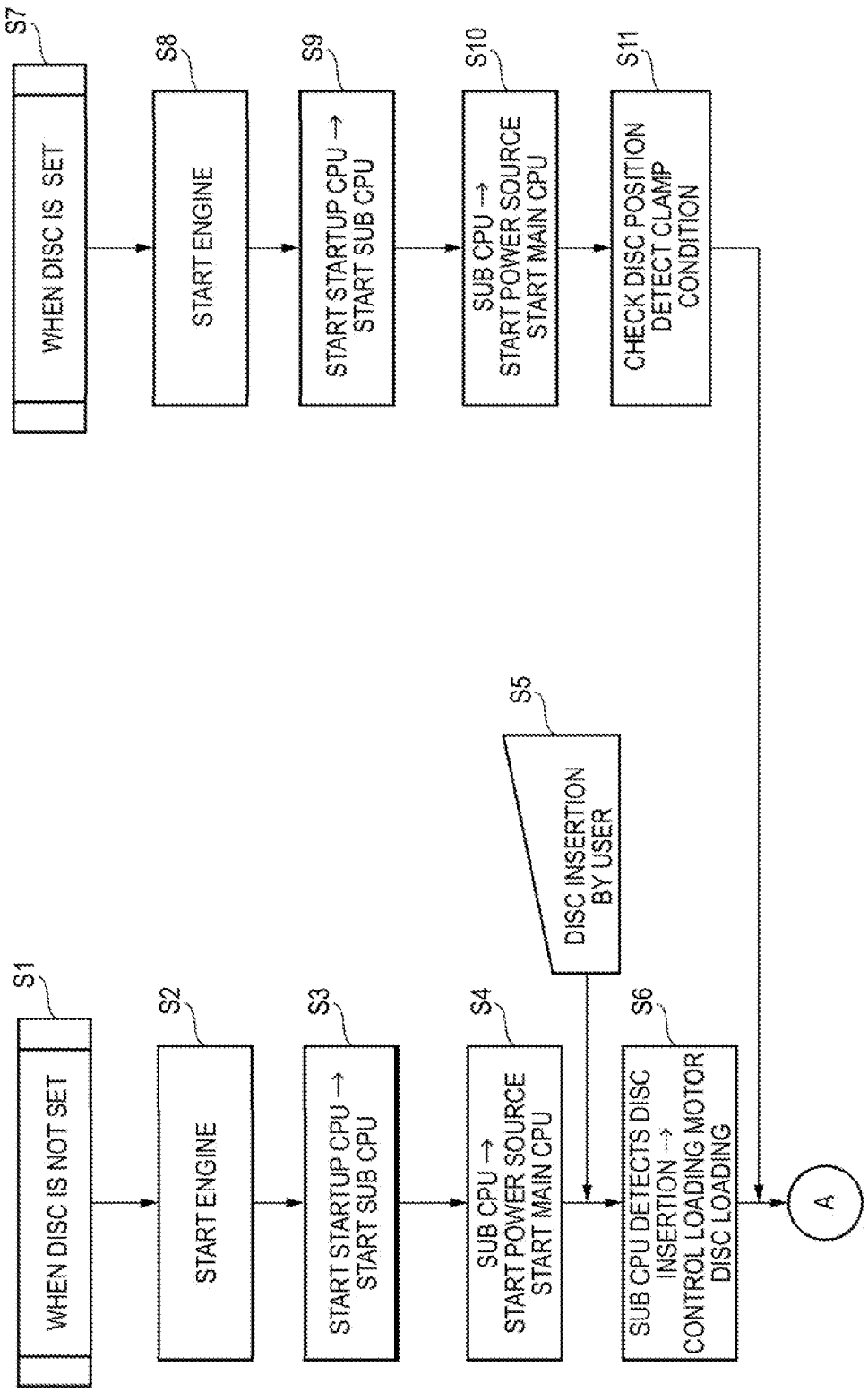
FIG. 3 A flowchart showing the operation of the onboard optical disc device of the embodiment.

First, in a case where the optical disc 7 is not set in the onboard optical disc device 6 (step S1 of FIG. 3), when the user drives the engine of the vehicle (step S2 of FIG. 3), the startup CPU 16 is started and starts the sub CPU 15 (step S3 of FIG. 3). When the sub CPU 15 is started and closes the switch 20, the main CPU 14 is coupled to the power source 19 through the switch 20, so that the main CPU 14 is started (step S4 of FIG. 3). Then, when the optical disc 7 is inserted into the onboard optical disc device 6 by the user (step S5 of FIG. 3), the sub CPU 15 detects the insertion of the optical disc 7, and starts the loading unit 10 through the motor driver 11 (step S6 of FIG. 3). That is, the optical disc 7 is drawn into the onboard optical disc device 6 and spun up by the spindle motor of the drive unit 8, and a condition is attained where data is read by the optical pickup unit 22.

On the other hand, in a case where the optical disc 7 is already set in the onboard optical disc device 6 (step S7 of FIG. 3), when the user drives the engine of the vehicle (step S8 of FIG. 3), the startup CPU 16 is started and starts the sub CPU 15 (step S9 of FIG. 3). When the sub CPU 15 is started and doses the switch 20, the main CPU 14 is coupled to the power source 19 through the switch 20, so that the main CPU 14 is started (step S10 of FIG. 3). Then, the main CPU 14 checks the disc position and detects the clamp condition, and a condition is attained where data is read by the optical pickup unit 22 (step S11 of FIG. 3).

Figure 4:
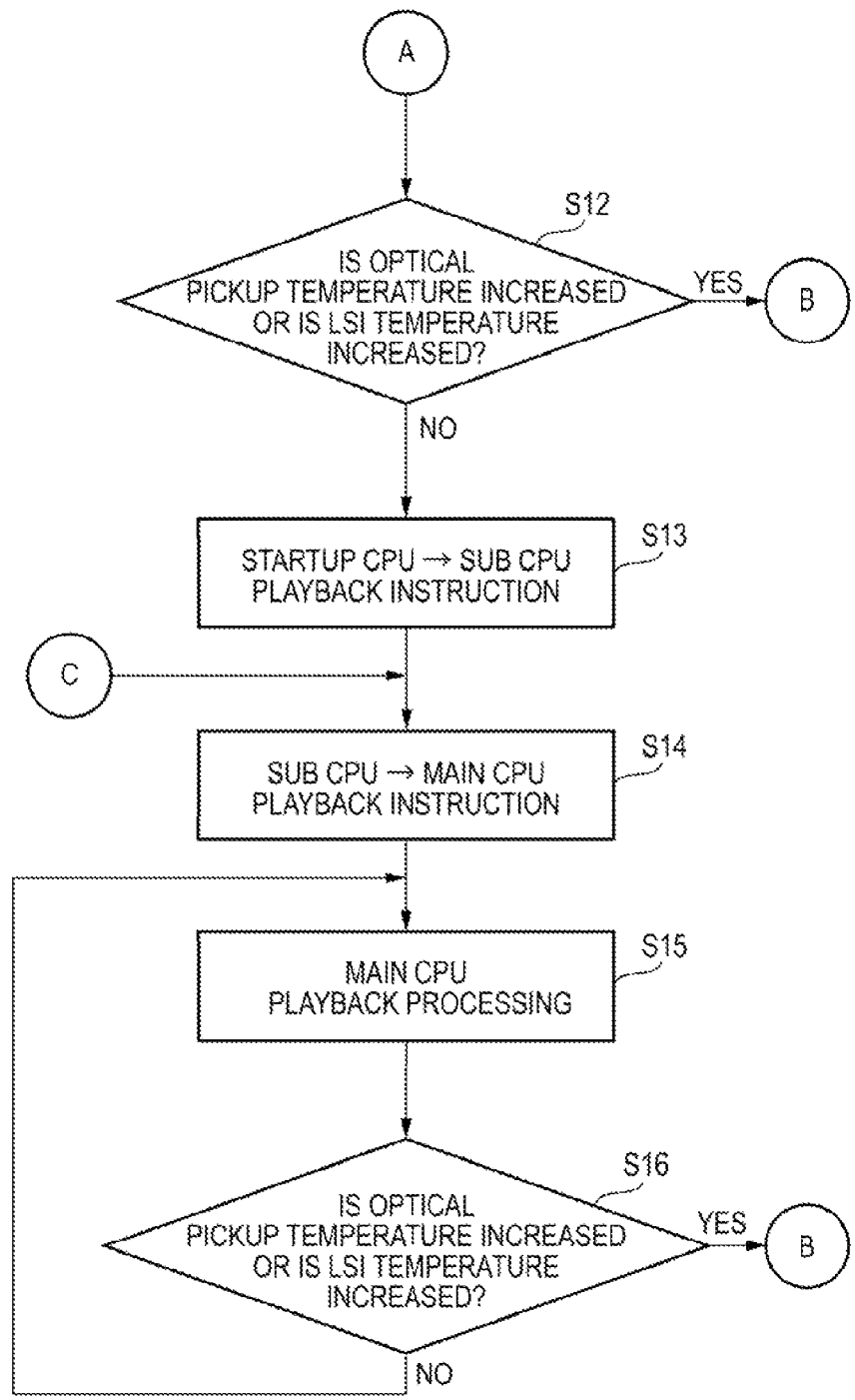
FIG. 4 A flowchart showing the operation of the onboard optical disc device of the embodiment.

After the above-described steps S1 to S6 or steps S7 to S11 are performed, a determination as to the rise in the temperature of the optical pickup unit 22 or the rise in the temperature of the main CPU 14, the sub CPU 15 or the startup CPU 16 is performed (step S12 of FIG. 4). Since the optical pickup unit 22 is provided with a temperature sensor (not illustrated), the temperature of the optical pickup unit 22 is measured by this non-illustrated temperature sensor. The temperature of the main CPU 14, the sub CPU 15 or the startup CPU 16 is measured by the LSI temperature sensor 17.

To the main CPU 14, power supply is shut off when the temperature becomes, for example, 50 degrees (an example of the set temperature) due to the influence of the in-vehicle temperature. On the other hand, to the sub CPU 15 and the startup CPU 16, although power supply is shut off for safety when the temperature becomes, for example, 100 degrees, power supply is never shut off in normal usage state. Therefore, at step S12 of FIG. 4, it is determined whether the temperature of the main CPU 14 is higher than 50 degrees (an example of the set temperature) or not. For example, in seasons other than summer, since the in-vehicle temperature does not become very high, the result of the determination at step S12 of FIG. 4 is NO, and the process shifts to step S13.

At step S13, the startup CPU 16 supplies a playback instruction to the sub CPU 15. Then, the sub CPU 15 supplies a playback instruction to the main CPU 14 (step S14 of FIG. 4).

At step S13, the sub CPU 15 closes the switch 20 to supply power from the power source 19 to the main CPU 14, and the switch 21 is switched to the side of the main CPU 14. When this condition is attained, the main CPU 14 drives the spindle motor of the drive unit 8 through the motor driver 9 to thereby drive the optical disc 7. Moreover, the main CPU 14 drives the optical pickup unit 22 through the actuator driver 12, and reads data from the optical disc 7. The main CPU 14 performs the processing of displaying an image or characters on the display unit 18 based on the data read from the optical disc 7, and performs the processing of outputting a sound from a non-illustrated speaker (step S15 of FIG. 4).

In the above-described playback processing by the main CPU 14, the temperature of the optical pickup unit 22 and the temperatures of the main CPU 14, the sub CPU 15 and the startup CPU 16 are also measured continuously (step S16 of FIG. 4).

Figure 5:
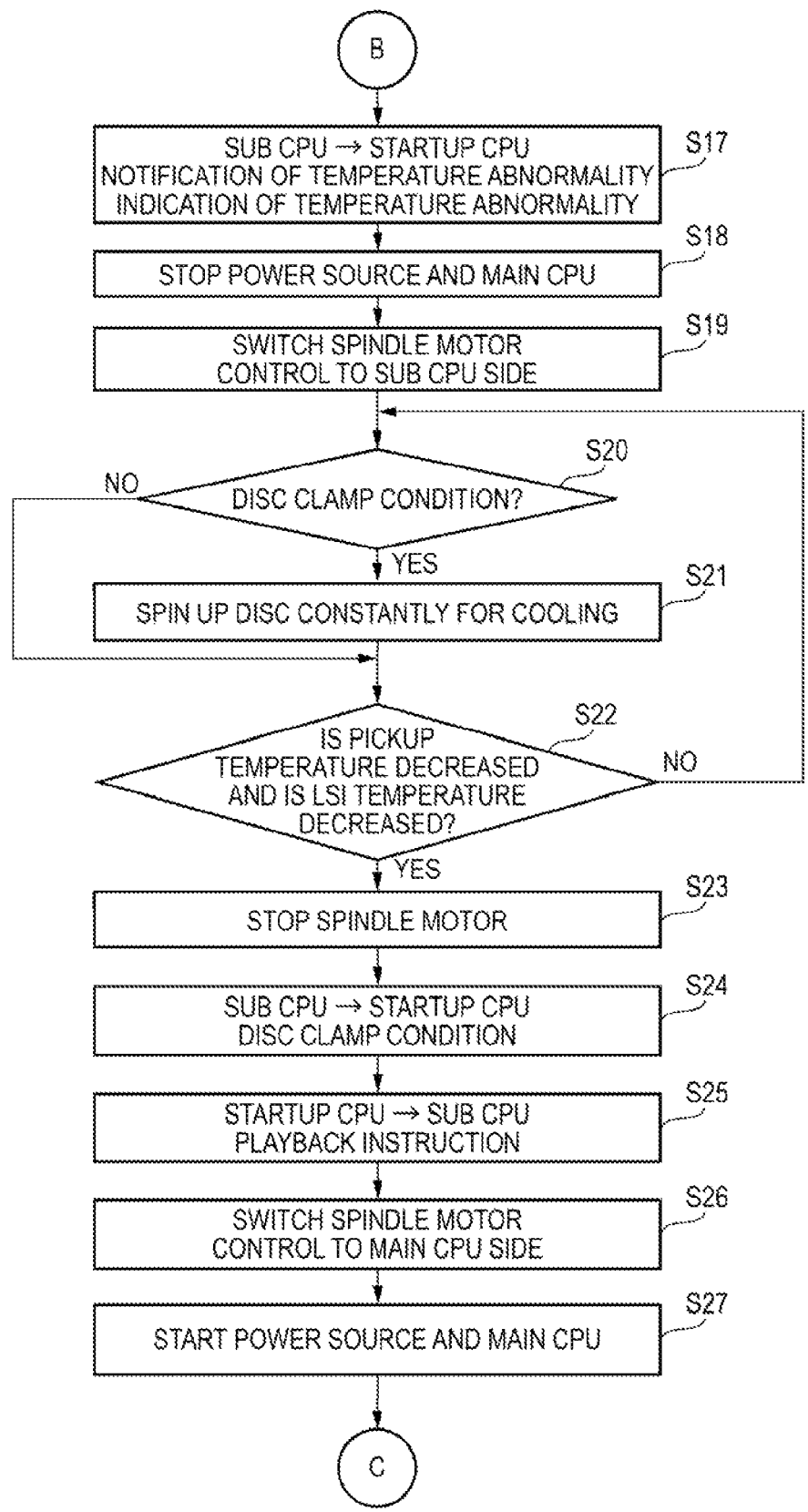
FIG. 5 A flowchart showing the operation of the onboard optical disc device of the embodiment.

On the other hand, when the temperature of the optical pickup unit 22 is abnormally high or when the temperature of the main CPU 14 or the like is abnormally high at step S12 of FIG. 4, the sub CPU 15 notifies the startup CPU 16 of the abnormality in temperature and performs the processing of indicating the abnormality in temperature on the display unit 18 (step S17 of FIG. 5). When a similar abnormality in temperature occurs at step S16 of FIG. 4, the process shifts to step S17. After step S17, by opening the switch 20, the sub CPU 15 shuts off the power supply to the main CPU 14 to stop the main CPU 14 (step S18 of FIG. 5).

Then, the sub CPU 15 switches the switch 21 from the main CPU 14 to the side of the sub CPU 15 (step S19 of FIG. 5).

Then, the sub CPU 15 determines whether the optical disc 7 is set on the spindle motor of the drive unit 8 or not (step S20 of FIG. 5). When the optical disc 7 is set, the sub CPU 15 drives the spindle motor of the drive unit 8 through the motor driver 9, and spins up the optical disc 7 for cooling (step S21 of FIG. 5). Then, it is determined whether the temperature of the optical pickup unit 22 and the temperatures of the main CPU 14 and the like become not more than their respective set values by this cooling or not (step S22 of FIG. 5), and when these temperatures are decreased, the sub CPU 15 stops the driving of the spindle motor of the drive unit 8 (step S23 of FIG. 5).

Then, the sub CPU 15 performs processing on the startup CPU 16 so as to indicate on the display unit 18 that the optical disc 7 is set (step S24 of FIG. 5). Then, the startup CPU 16 instructs the sub CPU 15 to play back the optical disc 7 (step S25 of FIG. 5). At this time, the sub CPU 15 closes the switch 20, and switches the switch 21 from the side of the sub CPU 15 to the side of the main CPU 14 (step S26 of FIG. 5). Then, power is supplied from the power source 19 to the main CPU 14 (step S27 of FIG. 5). After step S27, the process shifts to step S14 shown in FIG. 4, and the sub CPU 15 supplies a playback instruction to the main CPU 14. Thereafter, playback of the optical disc 7 shown at step S15 and the determination of the temperature rise shown at step S16 are performed.

As described above, in the present embodiment, when the temperature of the main CPU 14 detected by the LSI temperature sensor 17 exceeds the set temperature, the sub CPU 15 drives the drive unit 8 under the condition where the operation of the main CPU 14 is suspended to stop the rise in temperature caused by the main CPU 14, and the wind based on the driving of the optical disc 7 facilitates cooling. Consequently, cooling of the main CPU 14 advances, and the main CPU 14 starts again. In this way, the suspension time of data reading from the optical disc 7 or data writing to the optical disc 7 when the in-vehicle temperature is high can be shortened.

While the present invention has been described in detail with reference to a specific embodiment, it is obvious to one of ordinary skill in the art that various changes and modifications may be added without departing from the spirit and scope of the present invention.

The present application is based on Japanese Patent Application (Patent Application No. 2011-249270) filed on Nov. 15, 2011, the contents of which are incorporated herein by reference.

INDUSTRIAL APPLICABILITY

The onboard optical disc device according to the present invention includes the drive unit of an optical disc, the loading unit that conveys the optical disc to the drive unit or ejects the optical disc from the drive unit, the optical pickup unit that performs data reading from the optical disc driven by the drive unit or data writing to the optical disc, and the control unit connected to the optical pickup unit, the loading unit and the drive unit; the control unit has the main CPU connected to the drive unit and the optical pickup unit, the sub CPU connected to the loading unit and the drive unit, and the temperature sensor that detects the temperature of the main CPU; and when the temperature of the main CPU detected by the temperature sensor exceeds the set temperature, the sub CPU drives the drive unit. Consequently, the suspension time of data reading from the optical disc and data writing to the optical disc when the in-vehicle temperature is high can be shortened.

Moreover, when the temperature of the main CPU detected by the temperature sensor exceeds the set temperature, the sub CPU drives the drive unit under the condition where the operation of the main CPU is suspended to stop the rise in temperature caused by the main CPU. In this case, cooling of the main CPU advances by the wind based on the driving of the optical disc, and as a result, the suspension time of data reading from the optical disc or data writing to the optical disc until the main CPU restarts can be shortened.

DESCRIPTION OF REFERENCE NUMERALS AND SIGNS

1 Automobile
2 Interior
3 Driver seat
4 Passenger seat
5 Steering wheel
6 Onboard optical disc device
7 Optical disc
8 Drive unit
9 Motor driver
10 Loading unit
11 Motor driver
12 Actuator driver
13 Control unit
14 Main CPU
15 Sub CPU
16 Startup CPU
17 LSI temperature sensor
18 Display unit
19 Power source
20 Switch
21 Switch
22 Optical pickup unit

The invention claimed is:

1. An onboard optical disc device comprising:
a drive unit for an optical disc;
a loading unit that conveys the optical disc to the drive unit or ejects the optical disc from the drive unit;
an optical pickup unit that performs data reading from the optical disc driven by the drive unit or data writing to the optical disc; and
a control unit connected to the optical pickup unit, the loading unit and the drive unit,
wherein the control unit has:
a main CPU connected to the drive unit and the optical pickup unit;
a sub CPU connected to the loading unit and the drive unit; and
a temperature sensor that detects a temperature of the main CPU, and
wherein when the temperature of the main CPU detected by the temperature sensor exceeds a set temperature, the sub CPU drives the drive unit.

2. The onboard optical disc device according to claim 1, wherein when the temperature of the main CPU detected by the temperature sensor exceeds the set temperature, the sub CPU drives the drive unit and the loading unit.

3. The onboard optical disc device according to claim 1, wherein when the temperature of the main CPU detected by the temperature sensor exceeds the set temperature, the sub CPU performs processing so that an abnormality in temperature is displayed on a display unit.

4. The onboard optical disc device according to claim 3, wherein a startup CPU is connected to the sub CPU; and
wherein when the temperature of the main CPU detected by the temperature sensor exceeds the set temperature, the sub CPU notifies the startup CPU of the abnormality in temperature.

* * * * *